US006766689B2

(12) United States Patent
Spinola Durante et al.

(10) Patent No.: US 6,766,689 B2
(45) Date of Patent: Jul. 27, 2004

(54) INTEGRATED GYROSCOPE OF SEMICONDUCTOR MATERIAL

(75) Inventors: Guido Spinola Durante, Gavirate (IT); Sarah Zerbini, Fontanellato (IT); Simone Gardella, San Giovanni Valdarno (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/128,133

(22) Filed: Apr. 23, 2002

(65) Prior Publication Data

US 2002/0189354 A1 Dec. 19, 2002

(30) Foreign Application Priority Data

Apr. 27, 2001 (EP) .............................. 01830277

(51) Int. Cl.[7] .............................. G01P 9/04; G01C 19/00
(52) U.S. Cl. .................... 73/504.04; 73/504.12
(58) Field of Search ........................ 73/504.02, 504.16, 73/504.14, 514.29, 514.16, 504.12, 514.32, 504.04

(56) References Cited

U.S. PATENT DOCUMENTS

| 5,275,047 A | | 1/1994 | Zabler et al. ................. 73/505 |
| 5,604,312 A | | 2/1997 | Lutz ........................ 73/504.14 |
| 5,747,690 A | | 5/1998 | Park et al. ................ 73/504.12 |
| 5,792,954 A | * | 8/1998 | Corkum et al. ........... 73/514.32 |
| 5,945,599 A | | 8/1999 | Fujiyoshi et al. ........ 73/504.12 |
| 5,955,668 A | | 9/1999 | Hsu et al. ................. 73/504.12 |
| 6,089,089 A | * | 7/2000 | Hsu ......................... 73/504.12 |
| 6,327,907 B1 | * | 12/2001 | Park ......................... 73/504.12 |
| 6,349,597 B1 | | 2/2002 | Folkmer et al. .............. 73/504 |
| 6,474,160 B1 | * | 11/2002 | Stewart et al. ........... 73/504.04 |
| 2002/0134154 A1 | * | 9/2002 | Hsu et al. ................ 73/504.04 |

FOREIGN PATENT DOCUMENTS

| EP | 0 911 606 A1 | 4/1999 |
| EP | 1 098 170 A2 | 5/2001 |
| WO | WO 97/15066 | 4/1997 |
| WO | WO 99/19734 | 4/1999 |
| WO | WO 00/29855 | 5/2000 |

* cited by examiner

*Primary Examiner*—Helen Kwok
(74) *Attorney, Agent, or Firm*—Lisa K. Jorgenson; Harold H. Bennett, II; Seed IP Law Group PLLC

(57) ABSTRACT

The gyroscope is formed by a driving system including a driving mass having an open concave shape; an accelerometer including a sensing mass and comprising mobile sensing electrodes; a linkage connecting the driving mass to the sensing mass. The sensing mass is surrounded on three sides by the driving mass and has a peripheral portion not facing the sensing mass. The mobile sensing electrodes extend integral with the sensing mass from the peripheral portion not facing the driving mass and are interleaved with fixed sensing electrodes. Thereby, there are no passing electrical connections extending below the sensing mass. Moreover the linkage includes springs placed equidistant from the center of gravity of the accelerometer, and the gyroscope is anchored to the substrate with anchoring springs placed equidistant from the center of gravity of the assembly formed by the driving system and by the accelerometer.

25 Claims, 3 Drawing Sheets

INTEGRATED GYROSCOPE OF SEMICONDUCTOR MATERIAL

BACKGROUND OF THE INVENTION

1. Field of the Invention

The present invention relates to an integrated gyroscope of semiconductor material.

2. Description of the Related Art

As is known, integrated gyroscopes of semiconductor material, made with MEMS (Micro-Electro-Mechanical Systems) technology, operate according to the theorem of relative accelerations, exploiting the acceleration of Coriolis. In particular, when a linear velocity is applied to a mobile mass rotating with a constant angular velocity, the mobile mass "feels" an apparent force, called Coriolis force, which determines its movement in a direction perpendicular to the linear velocity and to the axis of rotation. The apparent force can therefore be detected by supporting the mobile mass with springs which allow it to move in the direction of the apparent force. According to Hooke's law, this movement is proportional to the apparent force and so detecting the movement of the mobile mass allows detecting the Coriolis force and therefore the angular velocity.

In gyroscopes of the considered type, the movement of the mobile mass is detected capacitively, measuring the capacitance variations caused by the movement of mobile sensing electrodes integral with the moving mass and interfaced or interleaved with fixed sensing electrodes.

Embodiments of integrated gyroscopes in MEMS technology are described, for example, in U.S. Pat. Nos. 5,604,312, 5,275,047 and WO 97/15066 assigned to Robert Bosch GmbH and in U.S. Pat. No. 5,955,668, WO 99/19734 and WO00/29855 assigned to IRVINE SENSORS CORPORATION. However, these gyroscopes have some drawbacks.

For example, U.S. Pat. No. 5,604,312 describes a gyroscope formed by an oscillating mass and an accelerometer mounted on the driving mass. This known gyroscope requires a complicated manufacturing process which uses two different structural layers, with consequent high manufacturing costs, poor reliability, complication in aligning the accelerometers and the oscillating masses and complication in the connections.

U.S. Pat. No. 5,955,668, WO 99/19734 disclose an external oscillating mass connected to an internal sensing mass, and therefore two independent mechanical parts which may be suitably calibrated. However, for the circular gyroscope (U.S. Pat. No. 5,955,668), the structure is sensitive to stress due to the manufacturing steps and to thermal drift, since the suspension springs of the sensing mass inside the external oscillating mass are very stiff in the direction of the axis of the angular velocity and it is not possible to anchor the sensing mass in the center because the gyroscope would feel the velocity of several axes at the same time and would become unusable. Vice-versa, for the rectangular gyroscope (WO patent 99/19734), the system is not optimized because it uses suspension springs which involve undesired rotational contributions; moreover the described gyroscope does not allow the rejection of linear accelerations. Moreover, in both cases, but particularly in the case of the translational gyroscope, numerous interconnections extend under the mass, and the interconnections are rather long, with the risk of capacitive couplings with the sensing structures and therefore of distortion or imprecision of reading.

BRIEF SUMMARY OF THE INVENTION

An embodiment of the invention provides a gyroscope in MEMS technology which solves the problems presented by prior art gyroscopes, and in particular is not affected by undesired capacitive couplings. Conveniently, the gyroscope according to the invention must be as far as possible insensitive to process spreads, to residual stress due to manufacturing steps and to thermal drift.

According to an embodiment of the present invention, an integrated gyroscope is provided.

In practice, the gyroscope is formed by a driving system including a driving mass having an open concave shape; an accelerometer including a sensing mass and mobile sensing electrodes; a mechanical connection (linkage) which connects the driving mass to the sensing mass. The sensing mass is surrounded on three sides by the driving mass and has a peripheral portion not facing this mass. The mobile sensing electrodes are integral with the sensing mass from the peripheral portion not facing the driving mass and are interleaved with fixed sensing electrodes. In this way, no electrical connections extend below the sensing mass. According to another aspect of the invention, the linkage includes springs placed equidistant from the center of gravity of the accelerometer, and according to yet another aspect, the gyroscope is anchored to the substrate through anchoring springs equidistant from the center of gravity of the assembly formed by the driving system and by the accelerometer.

A method of operation of the device is also provided, according to an embodiment of the invention.

BRIEF DESCRIPTION OF THE SEVERAL VIEWS OF THE DRAWING(S)

For the understanding of the present invention, a preferred embodiment is now described, purely as an example without limitation, with reference to the enclosed drawings, wherein.

Figure 2:
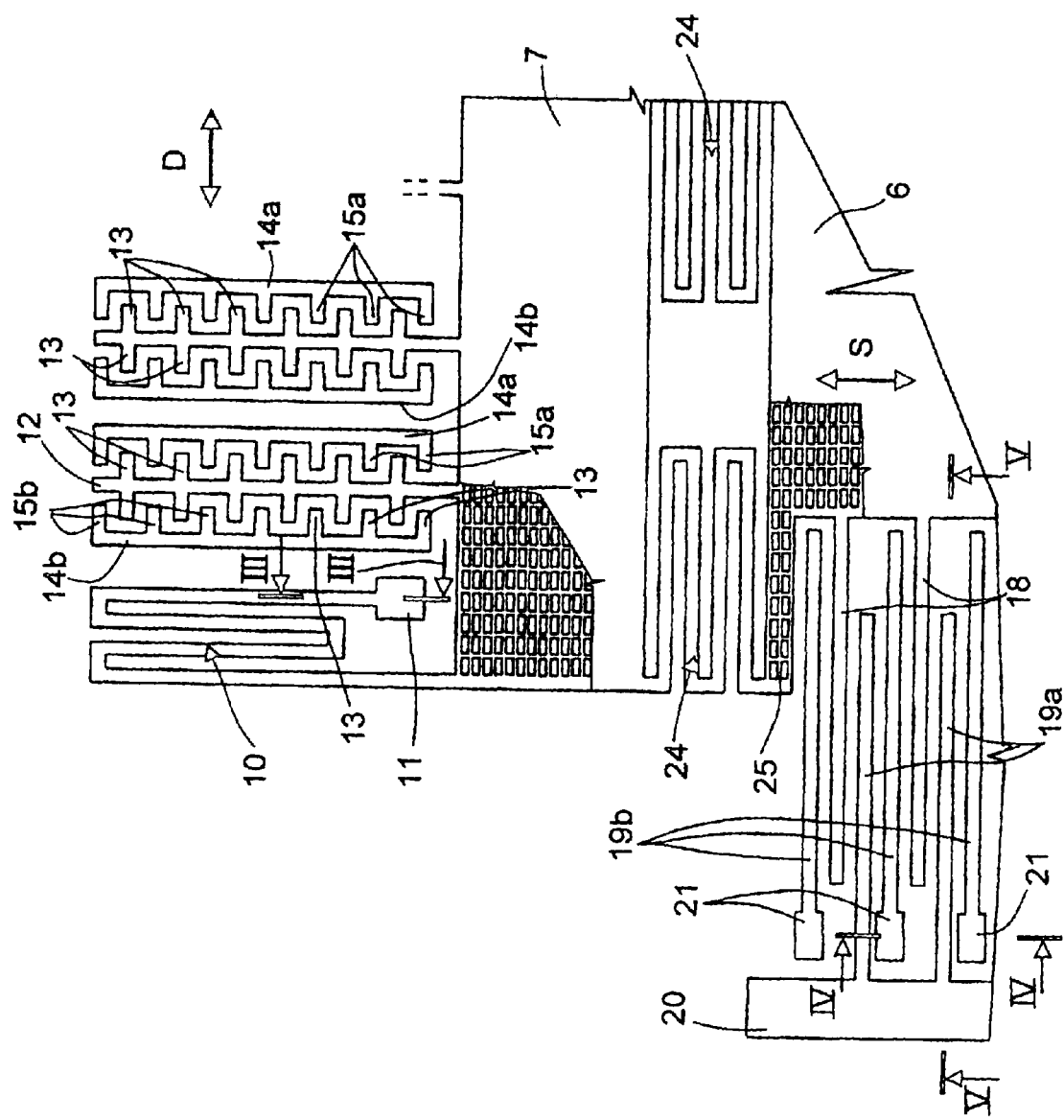
FIG. 2 shows a portion of the gyroscope in FIG. 1, on an enlarged scale.
Figure 3:
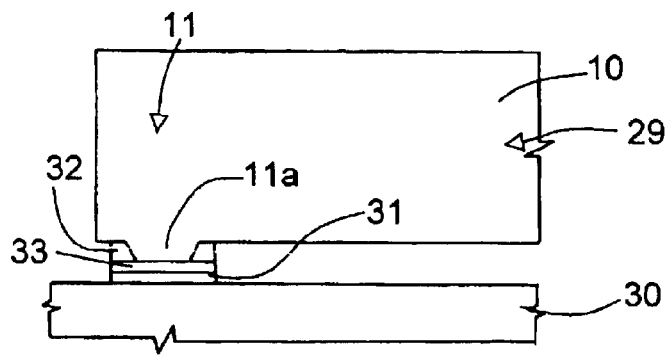
Figure 4:
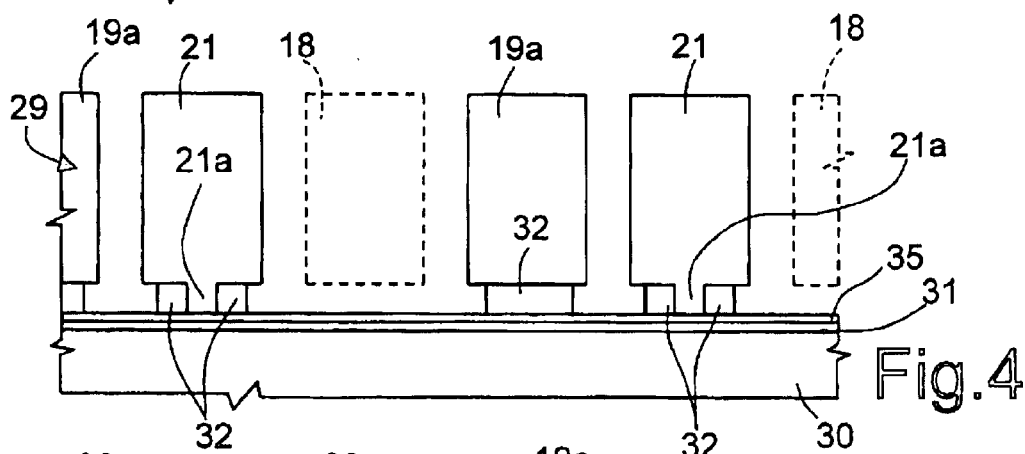
Figure 5:
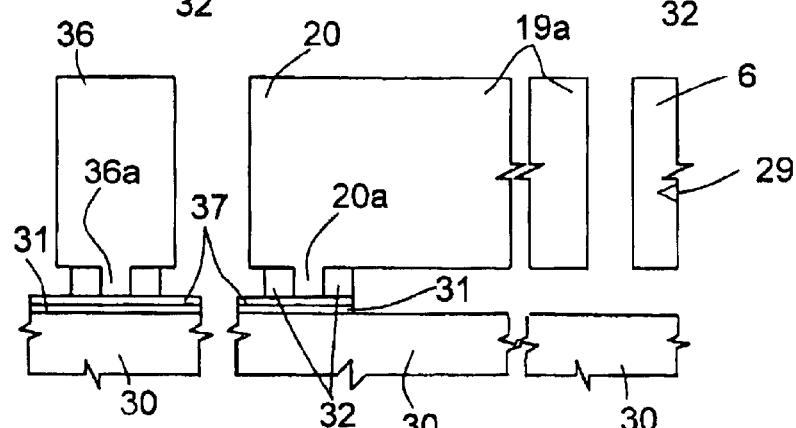
Figure 6:
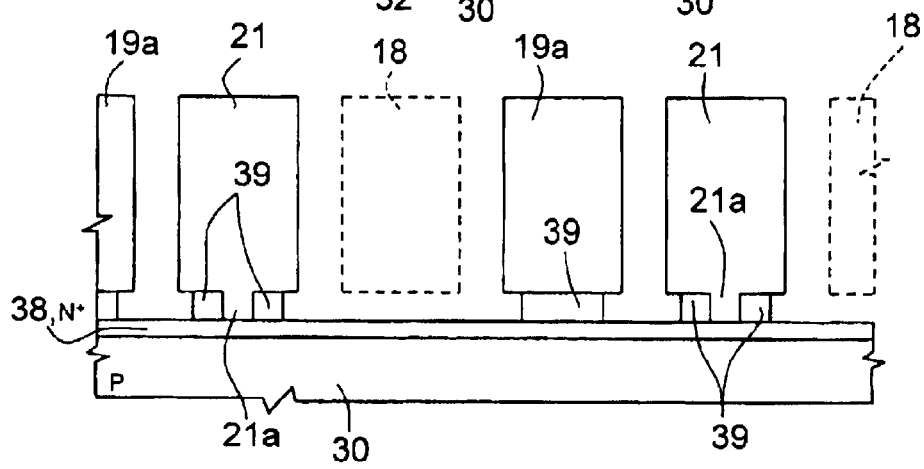

FIG. 3 presents a cross-section taken along line III—III of FIG. 2;

FIG. 4 presents a cross-section taken along line IV—IV of FIG. 2;

FIG. 5 presents a cross-section taken along line V—V of FIG. 2;

FIG. 6 shows a variation of FIG. 4.

DETAILED DESCRIPTION OF THE INVENTION

Figure 1:
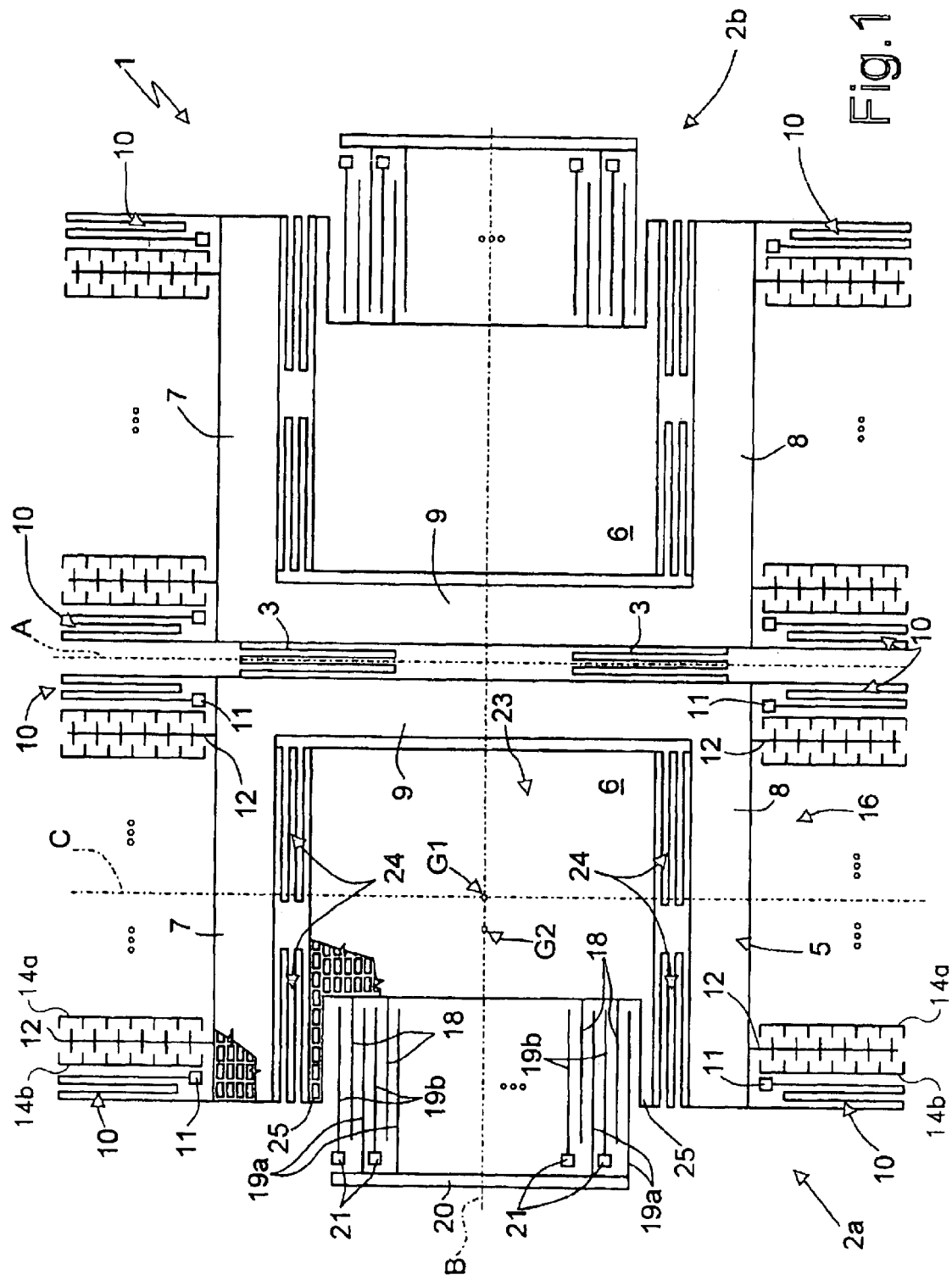
FIG. 1 shows a simplified diagram of the gyroscope according to the present invention.

FIGS. 1 and 2 show a gyroscope 1 of a translational type. The gyroscope 1 is formed by two parts 2a, 2b symmetrical with respect to a central axis of symmetry indicated with A and connected to each other through two central springs 3, symmetrical to a horizontal barycentric axis indicated with B. Moreover, each part 2a, 2b has a vertical barycentric axis indicated with C. The intersection between the horizontal barycentric axis B and the vertical barycentric axis C constitutes the center of gravity GI of each part 2a, 2b.

Each part 2a, 2b comprises a driving mass 5 with a concave shape, in the specific case shaped as a squared C, and a sensing mass 6 housed completely inside the space bounded by the driving mass 5, but having a peripheral portion not facing the driving mass 5. Both the driving mass 5 and the sensing mass 6 are perforated, as shown only in a portion thereof.

Each driving mass 5 includes a first and a second oscillating arm 7, 8 parallel to each other, connected at one end by a central cross member 9, extending perpendicularly to the oscillating arms 7, 8. The two cross members 9 of the parts 2a, 2b extend parallel to each other, face each other and are connected by the central springs 3. The first oscillating arms 7 are reciprocally aligned, as are the second oscillating arms 8.

Anchoring springs 10 extend from each end of the oscillating arms 7, 8 towards the outside of the respective driving masses 5. The anchoring springs 10 are of the folded type, that is they comprise at least two not aligned portions, one connected to the respective driving mass 5 and one having an anchoring end 11 rigid with a fixed substrate (as better described below with reference to FIG. 3). The anchoring springs 10 are equal to each other and are arranged in pairs symmetrically with respect to the vertical barycentric axis C and to the horizontal barycentric axis B, so that the anchoring springs 10 are equidistant and balanced with respect to the center of gravity G1 of the respective part 2a, 2b of the gyroscope. Here the anchoring springs 10 comprise four portions extending perpendicularly to the arms 7, 8 and connected, two by two, by short connecting lengths at the two ends.

Elongated expansions, hereinafter called mobile driving arms 12, extend outward from the oscillating arms 7, 8, perpendicularly to the same, between pairs of anchoring springs 10, symmetrically with respect to both the barycentric axes, horizontal B and vertical C. As is more clearly visible from FIG. 2, each mobile driving arm 12 carries a plurality of mobile driving electrodes 13, extending perpendicularly from both sides of the respective mobile driving arms 12.

With each mobile driving arm 12 is associated a pair of fixed driving arms 14a and 14b, parallel to the mobile driving arms 12 and carrying respective fixed driving electrodes 15a, 15b. The fixed driving electrodes 15a, 15b extend perpendicularly to the fixed driving arms 14a and 14b towards the respective mobile driving arms 12 and interleaved with the mobile driving electrodes 13. The fixed driving arms 15a are arranged all on a same side of the respective mobile driving arms 12 (in the example, on the right) and are all biased at a same first potential; likewise the fixed driving arms 15b are arranged all on the other side of the respective mobile driving arms 12 (in the example, on the left) and are all biased at a same second potential. For example, it is possible to use a biasing scheme with push-pull voltages.

The assembly formed by the driving mass 5, the driving arms 12 and the mobile driving electrodes 13 forms a driving system 16.

In the example illustrated, each sensing mass 6 has a rectangular shape and is surrounded on three sides by the respective driving mass 5; mobile sensing electrodes 18 extend from the fourth side of the sensing mass 6, parallel to the oscillating arms 7, 8 and are interleaved with the fixed sensing electrodes 19a, 19b. In detail, each mobile sensing electrode 18 is placed between a fixed sensing electrode 19a and a fixed sensing electrode 19b, the fixed sensing electrodes 19a are all arranged on a same first side of the mobile sensing electrodes 18 and are electrically connected to each other at the outer end by a first fixed anchoring region 20; the fixed sensing electrodes 19b are all arranged on a same second side of the mobile sensing electrodes 18 and are electrically connected to each other at respective second anchoring regions 21, formed at the outer ends and connected to each other by a buried conductive region, as shown in detail in FIG. 4 or in FIG. 6.

The assembly sensing mass 6-mobile sensing electrodes 18 forms an acceleration sensor or accelerometer 23 having a center of gravity G2.

Four coupling springs 24, of the folded type, extended between each sensing mass 6 and the respective facing oscillating arms 7, 8, in a symmetrical position with respect to the center of gravity G2 of the accelerometer 23; to this end, two of the coupling springs 24 are connected to the end of two protruding portions 25 laterally extending from each sensing mass 6, parallel to the mobile sensing electrodes 18.

The coupling springs 24 extend mainly parallel to the oscillating arms 7, 8 so that the accelerometer 23 move along with the driving mass 5 in a direction parallel to that of the oscillating arms 7, 8 and the sensing mass 6 may move in a direction perpendicular to that of the oscillating arms 7, 8.

In use, the driving mass 5 is put into oscillation in the direction of the double arrow D (FIG. 2) by the reciprocal and alternated attraction between the mobile driving electrodes 13 and the fixed driving electrodes 15a and 15b, in a per se known manner. The driving mass 5 puts in oscillation the sensing mass 6, which is also free to move in the direction of the double arrow S as an effect of the acceleration of Coriolis. Any movements in the direction S due to the acceleration of Coriolis can therefore be detected by the sensing electrodes 18, 19a, 19b and allow detection of the angular movements which cause the acceleration of Coriolis, in a per se known manner.

FIG. 3 shows a cross-section taken at an anchoring end 11 of an anchoring spring 10. The anchoring spring 10 (like the driving mass 5 and the sensing mass 6) is formed by a structural layer, here comprising an epitaxial layer 29 formed on top of a substrate 30 of single-crystal silicon. In particular, the anchoring end 11 has at the bottom a reduced portion 11a overlaying and in direct electrical contact with a first connecting region 33 of conductive material, for example deposited doped polysilicon. The first connecting region 33, which allows biasing of the anchoring spring 10 and more generally of the driving mass 5 and of the sensing mass 6 to the desired potential, is formed above an insulating layer 31, for example a deposited oxide, and a sacrificial layer 32, for example also of deposited oxide. In FIG. 3, the insulating layer 31 and the sacrificial layer 32 extend only below the anchoring end 11 and have been removed under the mobile parts (here the anchoring spring 10), as described briefly below.

FIG. 4 shows a first embodiment of an electrical connection between the second anchoring regions 21 of the fixed sensing electrodes 19b. Here the second anchoring regions 21, formed by the same structural layer as the anchoring springs 10, that is the epitaxial layer 29, have at the bottom a reduced portion 21a formed by the same epitaxial layer, overlaying and in direct electrical contact with a second connecting region 35 of conductive material, for example deposited doped polysilicon. The second connecting region 35 is formed above the insulating layer 31 and below the sacrificial layer 32, of which only a few portions are visible, left after freeing the mobile parts of the gyroscope 1. The section in FIG. 4 also shows the fixed sensing electrodes 19a and, on a plane farther back than that of the section, also the mobile sensing electrodes 18, consequently drawn with a dashed line, for sake of clarity.

FIG. 5 shows the connection between the first anchoring region 20 and a biasing region 36 (not shown in FIGS. 1 and 2), through a third connecting region 37 in a direct electrical contact with reduced portions 20a and 36a of the first anchoring region 20 and of the biasing region 36. The third connecting region 37 is formed of the same material as the first connecting region 35 (polysilicon), above the insulating layer 31 and below the sacrificial layer 32.

The gyroscope shown in FIGS. 1–5 is manufactured for example by depositing, on top of the substrate 30, the insulating layer 31; defining the insulating layer 31 so as to remove it where an electrical connection with the substrate 30 is necessary; depositing a polysilicon layer (for example doped polysilicon deposited by LPCVE—Low Pressure Chemical Vapor Deposition); defining the polysilicon layer so as to form the first, second and third connecting regions 33, 35, 37 (and where it is necessary to have buried electrical connections); depositing the sacrificial layer 32; making openings in the sacrificial layer 32 where the reduced portions 11a of the anchoring ends 11, the reduced portions 21a of the second anchoring regions 21 and the reduced portions 20a and 36a must be made; growing the epitaxial layer 29; etching trenches, to define the various regions of the gyroscope 1 (driving mass 5, sensing mass 6, mobile and fixed driving and sensing electrodes 13, 15a, 15b, 18, 19a, 19b and respective anchoring regions 12, 20 and the springs 3, 10, 24) which are therefore all formed in the same structural layer (epitaxial layer 29). Lastly the sacrificial layer 32 is removed, freeing the suspended mobile regions.

The wafer thus obtained is fixed to a further wafer intended to form caps, having the function of protecting the gyroscopes and of maintaining the desired pressure. In particular, the pressure must be low (~10–50 mTorr) to allow high quality factors so as to obtain both a high amplitude of driving oscillation and a high maximum movement, generated by the Coriolis force, thus maximizing the signal to be detected.

The two wafers are bonded in a vacuum using the usual wafer-to-wafer bonding techniques. According to a first solution, the wafer accommodating the gyroscopes is bonded to the wafer of the caps using an inorganic, vitreous paste which in practice forms a spacer. In a second solution, the anodic bonding technique is used, according to which a noble metal is deposited by evaporation on the wafer of the caps; then the two wafers are placed side-by-side and a voltage is applied between the wafers, at a predetermined temperature. In this way a eutectic alloy of noble metal and silicon is formed which guarantees the seal of the interlace. Lastly, the composed wafer is cut into dice.

FIG. 6 shows a different embodiment of the electrical connections, shown only as an example as regards the connections between the second anchoring regions 21 (and a biasing region not shown) and using the technique described in EP-A-0 911 606. In detail, here the second connecting region, indicated at 38, is formed by a buried region extending inside the substrate 30 and having $N^+$-type conductivity, while the substrate 30 is of P-type. Portions 39 of the sacrificial layer, formed by deposited oxide or by thermally grown oxide removed elsewhere, surround the reduced portions 21a of the second anchoring regions 21. The same solution, with buried contacts extending inside the substrate 30, is however usable for all the connections of the gyroscope of FIG. 1.

For implementing this second solution, the buried connections are initially formed by selectively implanting suitable doping ionic species inside the substrate 30. The sacrificial layer 39 is then deposited and is opened where the reduced portion 11a of the anchoring end 11 and the reduced portions 21a of the second anchoring regions 21 must be made, and in general where an electrical connection is necessary with the substrate 30 or with the buried connecting regions formed in the substrate 30; the process then continues as described above with the epitaxial growth and the subsequent processing steps.

The advantages of the described gyroscope are as follows. Firstly, it has a very compact structure, with optimum exploitation of space, though maintaining a certain freedom in dimensioning the sensing mass 6. This allows an improvement of the bias stability of the gyroscope, with minimum bulk.

The arrangement of the sensing mass 6 inside the volume bounded by the driving mass 5 gives rise to a high decoupling between the driving mass 4 and the sensing mass 6 in the direction of action of the Coriolis force.

The open shape of the driving mass 5 allows the sensing mass 6 to be arranged inside the volume bounded by the same and at the same time to have the sensing electrodes 18 and 19 facing directly towards the outside, and not completely surrounded by the driving mass 5, avoiding electrical connections passing above or below the sensing mass 6 for biasing the mobile and fixed sensing electrodes 18, 19 and sensing the capacitance variations. In this way the parasite capacitive couplings which deteriorate detection of the Coriolis force are reduced.

The implementation of the driving mass with an open shape allows the sensing mass 6 to be suitably shaped, in particular to be formed as an asymmetrical sensing mass supported in a barycentric way. In fact, as already indicated, the coupling springs 24 are arranged equidistant and balanced with respect to the center of gravity G2 of the sensing sensor 23; moreover each part 2a, 2b of the gyroscope 1 is anchored so that the anchoring springs 10 are equidistant with respect to the center of gravity G1 of each part 2a, 2b. In general, all the springs are arranged so as to avoid torque. The whole balancing indicated above allows compensation of a large part of the stress due to process spread, of the residual strain and of thermal stress; moreover the spurious movements of the masses linked with imbalance of the masses are also reduced.

The described gyroscope does not require particular configurations from the point of view of packaging and it may be inserted in standard plastic or ceramic packages, as long as they are hermetic.

The use of springs 10, 24 of a folded type allows optimum decoupling between the masses and between the gyroscope 1 and the support structure and high thermal insensitivity.

The implementation of both the masses 5, 6 in a single structural layer allows simplification of the manufacturing process and facilitates calibration operations because the structure is not affected by the inevitable misalignments present in the case of implementation of the driving mass and of the sensing mass in two different structural layers.

The topology used with two symmetrical parts 2a, 2b lastly allows the rejection of the common mode signal.

With the solution shown, the sensing electrodes 18, 19a, 19b may also be used for calibrating the gyroscope and for matching the two resonance frequencies (driving frequency and sensing frequency). In this way it is possible to keep down the number of necessary buried connections. Moreover, with the driving electrodes 13, 15a, 15b, it is possible to measure the usable capacitance in a loop system for automatic control of frequency, which allows driving auto-oscillation of the entire gyroscope 1.

Lastly it is clear that numerous modifications and variations may be made to the gyroscope herein described and illustrated, all within the scope of the invention, as defined in the appended Claims. For example, the driving mass 5 may have a different shape, for example a concave polygonal shape, which does not surround the sensing mass 6 on its whole perimeter, so that the latter has at least one side or one portion of the perimeter not facing the driving mass 5 and from which the mobile sensing electrodes 18 extend.

Moreover, the manufacturing process of the gyroscope may be different from the one described, supplied only for greater understanding, and reading of the capacitance of the mobile sensing electrodes 18 may take place with any electrostatic capacitive reading technique, even not differential.

All of the above U.S. patents, U.S. patent application publications, U.S. patent applications, foreign patents, foreign patent applications and non-patent publications referred to in this specification and/or listed in the Application Data Sheet, including but not limited to U.S. Pat. No. 5,275,047; U.S. Pat. No. 5,604,312; U.S. Pat. No. 5,955,688; International Patent Number WO97/15066; International Patent Number WO99/19734; and International Patent Number WO00/29855, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An integrated gyroscope, comprising:
   a driving group including a driving mass having an open concave shape;
   an acceleration sensor including a sensing mass having a peripheral portion not facing said driving mass and a sensing group of a capacitive type, said sensing mass being surrounded by said driving mass and said sensing group comprising mobile sensing electrodes integral with said sensing mass and extending from said peripheral portion of said sensing mass; and
   a linkage connecting said driving mass to said sensing mass.

2. A gyroscope according to claim 1 wherein said driving mass has a concave polygonal shape.

3. A gyroscope according to claim 2 wherein said driving mass has substantially the shape of a squared letter C and said sensing mass has a substantially rectangular shape.

4. A gyroscope according to claim 1 wherein said driving mass and said sensing mass are formed in a same structural layer.

5. A gyroscope according to claim 1 wherein said driving mass and said sensing mass are formed in a same epitaxial layer.

6. A gyroscope according to claim 1 wherein said driving mass and said sensing mass form masses completely suspended above a fixed body.

7. A gyroscope according to claim 6 wherein an anchoring group connects said driving mass to the fixed body.

8. A gyroscope according to claim 7 wherein said anchoring group comprises a plurality of anchoring springs extending from said driving mass to the outside.

9. A gyroscope according to claim 8 wherein said driving group further comprises a plurality of mobile driving electrodes extending integral from said driving mass, said driving system, said acceleration sensor and said linkage having a gyroscope center of gravity, said anchoring springs being arranged in a position equidistant from said gyroscope center of gravity.

10. A gyroscope according to claim 8 wherein said acceleration sensor has a sensing center of gravity and said linkage comprises a plurality of coupling springs arranged in a position equidistant from said sensing center of gravity.

11. A gyroscope according to claim 10 wherein said anchoring springs and said coupling springs are of the folded type.

12. A gyroscope according to claim 11 wherein said driving group determines an oscillation of said driving mass and of said acceleration sensor in a first direction and said sensing group senses a movement of said sensing mass in a second direction, perpendicular to said first direction, and wherein said anchoring springs extend in a direction prevalently parallel to said first direction and said coupling springs extend in a direction prevalently parallel to said second direction.

13. A gyroscope according to claim 1 comprising two symmetrical parts connected by central springs and each including driving group, its own acceleration sensor and a linkage.

14. An acceleration sensor, comprising:
    a semiconductor substrate;
    a driving mass coupled to the substrate and configured to oscillate in a first direction parallel to an upper surface of the substrate, the driving mass having a concavity;
    a sensing mass coupled to the driving mass and suspended within the concavity;
    a mobile sensing electrode coupled to the sensing mass and extending in a direction away from the driving mass; and
    a pair of fixed sensing electrodes coupled to the substrate and positioned on opposite sides of the mobile sensing electrode and configured to detect motion of the mobile sensing electrode in a direction perpendicular to the first direction and parallel to the upper surface of the substrate.

15. The sensor of claim 14, further comprising a plurality of anchoring springs configured to couple the driving mass to the substrate and to permit motion of the driving mass in the first direction.

16. The sensor of claim 15 wherein the anchoring springs are disposed symmetrically around the driving mass and balanced thereto with reference to a center of gravity of the driving mass.

17. The sensor of claim 14, further comprising a plurality of coupling springs configured to couple the sensing mass to the driving mass and to permit motion of the sensing mass in the second direction.

18. The sensor of claim 17 wherein the coupling springs are disposed symmetrically around the sensing mass and balanced thereto with reference to a center of gravity of the sensing mass.

19. The sensor of claim 14 wherein the driving mass and the sensing mass are formed in a same structural layer.

20. The sensor of claim 14 wherein the driving mass, the sensing mass, the mobile sensing electrode and the fixed sensing electrodes comprise a first gyroscope, and wherein the sensor further comprises a second gyroscope, functionally identical to the first gyroscope and coupled in the same manner to the substrate.

21. The sensor of claim 20 wherein the sensor is configured such that the concavities of the driving masses of the first and second gyroscopes face away from each other.

22. The sensor of claim 21 wherein the driving mass of the second gyroscope oscillates in the first direction.

23. The sensor of claim 22 wherein the sensing mass of the second gyroscope is configured to move in a third direction, parallel to the second direction.

24. A method, comprising:
oscillating a first mass in a first direction relative to a substrate, the first mass being coupled resiliently to the substrate; and
measuring acceleration of the substrate by sensing motion in a second direction relative to the substrate of a second mass perpendicular to the first direction, the second mass being coupled resiliently within a concave opening of the first mass.

25. The method of claim 24 wherein the substrate includes a pair of fixed sensing electrodes fixed to the substrate and capacitively coupled to a mobile sensing electrode coupled to the second mass, the fixed and mobile sensing electrodes being positioned on a side of the second mass facing away from the first mass.

* * * * *

UNITED STATES PATENT AND TRADEMARK OFFICE
CERTIFICATE OF CORRECTION

PATENT NO. : 6,766,689 B2
DATED : July 27, 2004
INVENTOR(S) : Guido Spinola Durante et al.

It is certified that error appears in the above-identified patent and that said Letters Patent is hereby corrected as shown below:

Column 8,
Line 21, "including driving group," should read as -- including a driving group, --.

Signed and Sealed this

Seventh Day of December, 2004

JON W. DUDAS
*Director of the United States Patent and Trademark Office*